United States Patent [19]

Tsao

[11] 4,139,655
[45] Feb. 13, 1979

[54] PHOTOCURABLE EPOXY COMPOSITIONS CONTAINING THIOPYRYLIUM SALTS

[75] Inventor: Jung-Tsien Tsao, Columbia, Md.

[73] Assignee: W. R. Grace & Co., New York, N.Y.

[21] Appl. No.: 904,156

[22] Filed: May 9, 1978

[51] Int. Cl.² .............................. C08F 2/46; C08F 4/00
[52] U.S. Cl. .................................. 427/44; 204/159.11; 204/159.14; 204/159.18; 204/159.24; 96/115 P; 427/54; 428/418
[58] Field of Search ....................... 204/159.11, 159.14, 204/159.18, 159.23, 159.24; 96/115 P; 427/44, 54

[56] References Cited

U.S. PATENT DOCUMENTS

| 3,816,278 | 6/1974 | Watt | 204/159.11 |
| 3,936,557 | 2/1976 | Watt | 428/211 |
| 4,026,705 | 5/1977 | Crivello et al. | 96/27 R |
| 4,069,054 | 1/1978 | Smith | 96/115 P |

Primary Examiner—Richard B. Turer

Attorney, Agent, or Firm—Richard P. Plunkett; William W. McDowell, Jr.

[57] ABSTRACT

This invention relates to photocurable compositions comprising an epoxy resin and a catalytic amount of a photodecomposable thiopyrylium salt of the formula:

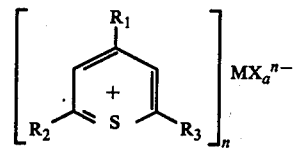

where $R_1$, $R_2$ and $R_3$ are independently selected from the group consisting of hydrogen, alkyl containing 1 to 10 carbon atoms, cycloalkyl containing 5 to 12 carbon atoms, aryl containing 6 to 12 carbon atoms and substituted derivatives thereof, M is a metal or metalloid, X is a halogen radical, a is a whole number equal to 1 to 10 and n is a whole number equal to 1 to 3.

12 Claims, No Drawings

PHOTOCURABLE EPOXY COMPOSITIONS CONTAINING THIOPYRYLIUM SALTS

The present invention relates to epoxy resin compositions which can be cured by exposure to radiant energy.

Epoxy resins are generally employed in applications requiring high performance materials. Cure of an epoxy resin is normally achieved by two package systems based on the incorporation into the resin of active amine containing compounds or carboxylic acid anhydrides. These systems require thorough mixing of the ingredients; in addition, cure time can be several hours.

Another catalyst which can be used to cure epoxy resins as a "one package" system is based on a Lewis Acid catalyst in the form of an amine complex such as boron trifluoride-monoethyl amine. The Lewis Acid is released on heating; cure takes place within 1 to 8 hours and can require a temperature of 160° C. and higher.

As shown by Schlesinger, U.S. Pat. No. 3,708,296, certain photosensitive aromatic diazonium salts can be employed to cure epoxy resins. When photolyzed, these aromatic diazonium salts are capable of releasing, in situ, a Lewis Acid catalyst which can initiate the rapid polymerization of the epoxy resin. However, even though these one package epoxy resin mixtures can provide fast curing compositions, a stabilizer must be used to minimize cure in the dark during storage of these mixtures. Despite these measures, gellation of the mixture can occur even in the absence of light. In addition, nitrogen is released during UV cure, which can result in film imperfections. Diazonium salts are generally thermally unstable, rendering the use of such materials hazardous because of the possibility of run-away decomposition.

As further shown by Crivello, U.S. Pat. No. 4,069,055 and U.S. Pat. No. 4,058,401, radiation induced polymerization of epoxides can also be achieved by the use of certain radiation sensitive onium salts of Group Va and VIa elements, in particular various aromatic sulfonium salts.

Thiopyrylium salts are known and recognized in the art. Triaryl-substituted thiopyrylium compounds, for example, can be prepared from the corresponding pyrylium salts by the procedure described in R. Wizinger and P. Ulrich; Helv. Chim. Acta., 39, 207 (1956). The pyrylium salts can be prepared by the procedure shown in R. Wizinger, S. Losinger and P. Ulrich, Helv. Chim. Acta., 39, 5 (1956); W. Dilthey, J. Prakt, Chem., [2] 94, 53 (1916); K. Dimroth, Angew. Chem., 72, 331 (1960); A. T. Balaban, Compt. Rend., 256, 4239 (1963) and J. A. Durden and D. G. Crosby, J. Org. Chem., 30, 1684 (1965).

The present invention is based on the discovery that thiopyrylium salts, such as

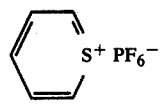

can be incorporated into epoxy resins to provide radiation curable compositions.

Included in the thiopyrylium salts, which can be employed in this invention, are compounds of the formula:

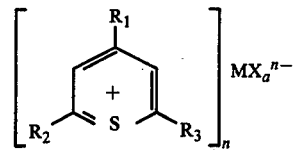

where $R_1$, $R_2$ and $R_3$ are independently selected from the group consisting of hydrogen, alkyl containing 1 to 10 carbon atoms, cycloalkyl containing 5 to 12 carbon atoms, aryl containing 6 to 12 carbon atoms and substituted derivatives thereof, M is a metal or metalloid, X is a halogen radical, a is a whole number equal to 1 to 10 and n is a whole number equal to 1 to 3. Typical $MX_a{}^{n-}$ complex anions are well known in the art and include, but are not limited to, $BF_4{}^-$, $PF_6{}^-$, $AsF_6{}^-$, $SbF_6{}^-$, $FeCl_4{}^{--}$, $SnCl_6{}^-$, $SbCl_6{}^-$, $BiCl_5{}^{--}$, $AlF_6{}^{---}$, $GaCl_4{}^-$, $InF_4{}^-$, $TiF_6{}^{--}$, $ZrF_6{}^{--}$ and the like. M can be a transition metal such as Sb, Fe, Sn, Bi, Al, Ga, In, Ti, Zr, Sc, V, Cr, Mn, Co, rare earth element such as a lanthanide, for example, Ce, Pr, Nd, actinide such as Th, Pa, U, Np, and metalloid such as B, P, As and the like.

Because of the enhanced stability of the salt, preferred embodiments of this invention are thiopyrylium salts in which the thiopyrylium ring is substituted by phenyl groups, for example, 2,4,6-triphenyl thiopyrylium salts:

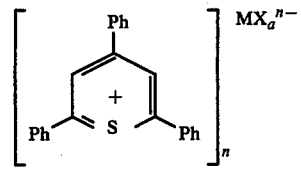

There is provided by the present invention curable epoxy compositions comprising an epoxy resin polymerizable to a higher molecular weight state selected from epoxy monomer, epoxy prepolymer, oxirane containing organic polymer and mixtures thereof, and an effective amount of a radiation sensitive thiopyrylium salt capable of effecting the cure of the epoxy resin by release of a Lewis Acid catalyst when exposed to radiant energy.

The term "epoxy resin" as utilized in the description of the curable compositions of the present invention, includes any monomeric, dimeric, oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol-formaldehyde resins (Novolak resins) with epichlorohydrin, diepoxide of cycloaliphatic hydrocarbon, ether or ester such as (3,4-epoxycyclohexyl) methyl 3,4-epoxycyclohexanecarboxylate, can be used alone or in combination with an epoxy containing compound as a reactive diluent. Such reactive diluents are well known and include, but are not limited to, phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, which may be added as viscosity modifying agents.

In addition, the range of these compounds can be extended to include polymeric materials containing terminal or pendant epoxy groups. Examples of these compounds are viny copolymers containing glycidyl acrylate or methacrylate as one of the comonomers. Other classes of epoxy containing polymers amenable to cure using the above catalysts are epoxy-siloxane resins, epoxy-polyurethanes and epoxy polyesters. Further examples of epoxy resins which can be used are shown in the Encyclopedia of Polymer Science and Technology, Vol. 6, 1967, Interscience Publishers, New York, pp 209–271, incorporated hereby by reference.

The curable compositions of the present invention can be made by blending the epoxy resin, which hereinafter will signify epoxy monomer, epoxy prepolymer, epoxy polymer or mixtures thereof, with an effective amount of the thiopyrylium salt. The resulting curable composition, which can have a viscosity of from 1 centipoise to 100,000 centipoises at 25° C., can be applied to a variety of substrates by conventional means and cured to the tack-free state within 0.1 sec. or less to 10 minutes or more.

The proportion of thiopyrylium salt to epoxy resin can vary widely inasmuch as the salt is substantially inert, unless activated. Effective results can be achieved if a proportion of from 0.1% to 10% by weight of thiopyrylium salt is employed, based on the weight of the epoxy resin. Higher or lower amounts can be used, however, depending upon factors such as the nature of epoxy resin, intensity of radiation, cure time desired, etc.

The compositions to be cured, i.e., (converted to solid coatings) in accord with the present invention are ordinarily transparent or translucent but may, if desired, include such additives as antioxidants, accelerators, dyes, inhibitors, activators, fillers, pigments, antistatic agents, flame-retardant agents, viscosity modifiers, extending oils, plasticizers, tackifiers and the like within the scope of this invention. Such additives are usually preblended with the epoxides prior to or during the compounding step. Operable fillers include natural and synthetic resins, carbon black, glass fibers, wood flour, mica flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide, sand and the like. The aforesaid additives may be present in quantities up to 500 parts per 100 parts of the epoxy compositions by weight and preferably 0.005–300 parts on the same basis.

The preferred means of curing is by means of electromagnetic radiation of wavelength about 2,000 A to 7,000 A. Such radiation can be obtained by the use of high or medium pressure mercury lamps, xenon lamps, mercury xenon lamps, lasers and the like. Lamps may be long arc or short arc, water or air cooled. The lamps can include envelopes capable of transmitting light of a wavelength of from about 1,849 A to 4,000 A and preferably 2,400 A to 4,000 A. The lamp envelope can consist of quartz, such as Spectrocil or of Pyrex, etc. Typical lamps which can be employed for providing ultraviolet radiation are, for example, medium pressure mercury arcs, such as the GE H3T7 arc and the Hanovia 200 W/in. arc lamp. The cures may be carried out with a combination of various lamps.

Although the preferred means of curing is by means of electromagnetic radiation of wavelength of about 2,000–7,000 A (because of simplicity, economy and convenience), the epoxy composition of the instant invention can be cured also by high energy ionizing irradiation. A preferred feature of the ionizing irradiation operation of the instant invention is treatment with high energy particle irradiation or by gamma-rays or X-rays. Irradiation employing particles in the instant invention includes the use of positive ions (i.e., protons, alpha particles and deuterons and also electrons or neutrons). The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchroton or the like.

The following examples are set out to explain, but expressly not limit, the instant invention. Unless otherwise noted, all parts and percentages are by weight.

EXAMPLE 1

A solution of benzaldehyde (17 g), acetophenone (40 g) and phosphorous oxychloride (92 g) was heated in a flask at about 50° C. for 2 hours under the protection of a drying tube. The excess phosphorous oxychloride was then removed by distillation under reduced pressure to give a dark residue. To the residue, alcohol (about 700 ml) was added and the mixture was heated to boiling followed by filtration to remove insoluble materials. After the warm filtrate had been treated with fluoroboric acid (30 g; 48–50% solution), the mixture was allowed to stand in a refrigerator for 2 hours. The bright, yellow, fluffy solids which separated were collected by filtration, washed with cold ethanol and then ether and vacuum-dried to give 16 g (50%) of highly pure 2,4,6-triphenylpyrylium tetrafluoroborate, m.p. 222°–225° C. The NMR spectrum (DMSO-$d_6$) shows a singlet at 9.1 p.p.m. (2H) and multiplets at 8.55 p.p.m (6H) and 7.8 p.p.m. (9H) (downfield from internal tetramethylsilane reference). Since the 2,4,6-triphenylpyrylium tetrafluoroborate resulting from this procedure was very pure, it was used for the following preparation of 2,4,6-triphenylthiopyrylium salts with no further purification being needed. A mixture of 2,4,6-triphenylpyrylium tetrafluoroborate (7.92 g) in acetone (250 ml) and water (250 ml) was warmed to about 45° C., and a solution of sodium sulfide hydrate (17.6 g) in distilled water (40 ml) was added producing a deep ruby-red color. After about 30 min. the solution was divided into two equal portions. One portion of the solution was acidified with fluoroboric acid (~50 g; 48–50% solution), followed by the addition of distilled water to make up to 1,000 ml. The mixture was allowed to stand for 2 hours and the yellow products collected and washed well with ether. Recrystallization from dichloromethane-petroleum ether (b.p. 35°–60° C.) afforded 2.6 g (63%) of 2,4,6-triphenylthiopyrylium tetrafluoroborate, m.p. 201°–204° C. The proton NMR spectrum (in a mixture of acetone-$d_6$ and DMSO-$d_6$) of this product showed absorptions at 9.1 (S, 2H), 8.25 (m, 6H) and 7.65 p.p.m. (m, 9H) downfield from internal tetramethylenesilane reference. The UV-visible spectrum of this product features three absorption maxima at 280, 372 and 412 nm in chloroform.

To the other portion of the solution supra was added potassium hexafluorophosphate (3.7 g) in water solution. Upon acidification with dilute hydrochloric acid, there was obtained a yellow deposit. After dilution with water and further standing for 2 hours, the mixture was filtered to collect the products which were washed well with ether. Recrystallization from dichloromethane-petroleum ether (b.p. 35°-60° C.) afforded 3 g (64%) of 2,4,6-triphenylthiopyrylium hexafluorophosphate m.p. 239°-241° C. The proton NMR spectrum (in a mixture of acetone-$d_6$ and DMSO-$d_6$) of this product showed absorptions at 9.26 (S, 2H), 8.3 (m, 6H) and 7.75 p.p.m. (m, 9H) downfield from internal tetramethylenesilane reference. The UV-visible spectrum of this product featured three absorption maxima at 280, 372 and 412 nm in chloroform.

EXAMPLE 2

Following the procedure of Example 1, other thiopyrylium salts were prepared from the corresponding pyrylium tetrafluoroborate starting with benzaldehyde or its derivatives and acetophenone or its derivatives. In TABLE I are listed several compounds synthesized along with their melting point (determined in a Fisher-John's melting point apparatus), appearance, yield and their parent aldehydes and acetophenones.

ether. Recrystallization from dichloromethane-petroleum ether (b.p. 35°-60°) afforded 0.5 g (25%) of 2-methyl-4,6-diphenylthiopyrylium hexafluorophosphate, m.p. 229°-232°.

EXAMPLE 4

A solution of 0.05 g of 2,4,6-triphenylthiopyrylium hexafluorophosphate in 1.5 ml of acetone was mixed with 1 g of (3,4-epoxycyclohexyl)methyl-3,4-epoxycyclohexanecarboxylate. A portion of the solution was added to a 1.58 cm diameter × 0.05 cm deep circular cell. After 75 sec. irradiation with a xenon lamp at an intensity of 65 milliwatts/$cm^2$, a cured (0.02 cm thick) product was obtained.

EXAMPLE 5

The procedure of Example 4 was repeated except that 0.05 g of 2,4,6-triphenylthiopyrylium tetrafluoroborate was used in place of the corresponding hexa-

TABLE I

| REACTANTS | | PRODUCT | | | |
|---|---|---|---|---|---|
| Benzaldehyde | Acetophenone | Thiopyrylium Salts | M.P.° C | Yield(%)* | Color of Salt |
| (1) p-methoxybenzaldehyde | acetophenone | 2,6-diphenyl-4-p-methoxyphenyl-thiopyrylium tetrafluoroborate | 198-201 | 45 | gold |
| (2) p-methoxybenzaldehyde | acetophenone | 2,6-diphenyl-4-p-methoxyphenyl-thiopyrylium hexafluorophosphate | 214-217 | 45 | orange |
| (3) p-nitrobenzaldehyde | acetophenone | 2,6-diphenyl-4-p-nitrophenylthio-pyrylium tetrafluoroborate | 268-271 | >10 | dark brown |
| (4) p-nitrobenzaldehyde | acetophenone | 2,6-diphenyl-4-p-nitrophenylthio-pyrylium hexafluorophosphate | 256-259 | >10 | dark brown |
| (5) p-chlorobenzaldehyde | acetophenone | 2,6-diphenyl-4-p-chlorophenyl-thiopyrylium tetrafluoroborate | 205-208 | 76 | orange |
| (6) p-chlorobenzaldehyde | acetophenone | 2,6-diphenyl-4-p-chlorophenyl-thiopyrylium hexafluorophosphate | 228-231 | 48 | yellow |
| (7) benzaldehyde | p-methyl-acetophenone | 2,6-di-p-tolyl-4-phenylthio-pyrylium tetrafluoroborate | 207-210 | 22 | yellow |
| (8) benzaldehyde | p-methyl-acetophenone | 2,6-di-p-tolyl-4-phenylthio-pyrylium hexafluorophosphate | 215-218 | 14 | golden yellow |
| (9) p-methoxybenzaldehyde | p-methoxy-acetophenone | 2,4,6-tri-p-methoxyphenylthio-pyrylium tetrafluoroborate | 268-271 | 40 | brownish red |
| (10) p-methoxybenzaldehyde | p-methoxy-acetophenone | 2,4,6-tri-p-methoxyphenylthio-pyrylium hexafluorophosphate | 293-296 | 57 | brownish red |

*Based on the pyrylium tetrafluoroborate precursor used.

EXAMPLE 3

2-Methyl-4,6-diphenylpyrylium tetrafluoroborate was prepared according to the procedure of J. A. Durden and D. G. Crosby, J. Org. Chem., 30, 1684 (1965) by reacting acetophenone and acetic anhydride with boron trifluoride etherate. The corresponding thiopyrylium tetrafluoroborate and hexafluorophosphate salts were prepared by adapting the method of R. Wizinger and P. Ulrich, Helv. Chim. Acta., 39, 217 (1956) with some modification as follows. To a solution of 3.34 g of 2-methyl-4,6-diphenylpyrylium tetrafluoroborate (m.p. 240°-241°) in 125 ml of acetone and 125 ml of water was added 8.8 g of sodium sulfide hydrate in 40 ml of distilled water. After about 5 min. the solution was divided into two equal portions.

One portion of the solution was acidified with fluoroboric acid (25 g; 48-50% solution) followed by the addition of distilled water (about 100 ml). The mixture was allowed to stand for 2 hours and the yellow products collected and washed well with ether. Recrystallization from dichloromethane-petroleum ether (b.p. 35°-60°) afforded 0.4 g (23%) of 2-methyl-4,6-diphenylthiopyrylium tetrafluoroborate, m.p. 206°-209°. To the other portion of the solution supra was added 1.25 g of potassium hexafluorophosphate in 30 ml of water. Upon acidification with dilute hydrochloric acid, there separated a yellow solid. After dilution with water and further standing for 2 hours, the mixture was filtered to collect the products which were washed well with fluorophosphate. A cured product was obtained.

EXAMPLE 6

Curable compositions were prepared by forming a mixture of 0.3 part of various thiopyrylium salts dissolved in a minimum amount of acetone and 9.7 parts of (3,4-epoxycyclohexyl)methyl-3,4-epoxycyclohexanecarboxylate. A less than 0.0012 cm film of each composition was spread on a steel plate by a hand-roller and exposed to ultraviolet in a UV curing unit. The curing unit consisted of two medium pressure mercury lamps (200 watts/in), 28 cm apart and situated 8 cm above a conveyor belt on which the coated plates were placed. The coating was given a 0.9 second exposure per pass through the UV unit at a conveyor speed of 30.5 meters/min. The number of passes that were needed to give an adherent, tack-free coating for a variety of thiopyrylium salts is shown in TABLE II.

TABLE II

| Thiopyrylium Salts | Number of Passes |
|---|---|
| 2,4,6-triphenylthiopyrylium tetrafluoroborate | 50 |
| 2,4,6-triphenylthiopyrylium hexafluorophosphate | 40 |
| 2,6-di-p-tolyl-4-phenylthiopyrilium tetrafluoroborate | 33 |
| 2,6-di-p-tolyl-4-phenylthiopyrylium hexafluorophosphate | 2 |
| 2,6-diphenyl-4-p-chlorophenylthiopyrylium tetrafluoroborate | 2 |

TABLE II-continued

| Thiopyrylium Salts | Number of Passes |
| --- | --- |
| 2,6-diphenyl-4-p-chlorophenylthiopyrylium hexafluorophosphate | 2 |
| 2-methyl-4,6-diphenylthiopyrylium tetrafluoroborate | 66 |

EXAMPLE 7

A solution of 0.3 parts of 2,4,6-tri-p-methoxyphenylthiopyrylium tetrafluoroborate was dissolved in 0.8 parts of γ-butyrolactone and the solution was mixed with 9.7 parts of (3,4-epoxycyclohexyl)methyl 3,4-epoxycyclohexanecarboxylate. A portion of this composition was spread by a hand-roller in a thin film of less than 0.0012 cm over a steel plate and exposed to ultraviolet light in the UV curing unit described in Example 6. A tack-free coating was obtained in three passes through the UV units at a conveyor speed of 30.5 meters/min.

EXAMPLE 8

A solution of 0.3 parts of 2,6-diphenyl-4-p-methoxyphenylthiopyrylium hexafluorophosphate was dissolved in 0.5 parts of γ-butyrolactone and the solution was mixed with 10 parts of (3,4-epoxycyclohexyl)methyl 3,4-epoxycyclohexanecarboxylate. A portion of this composition was spread by a hand-roller in a thin film of less than 0.0012 cm over a steel plate and exposed to ultraviolet light in the UV curing unit described in Example 6. An adherent, tack-free coating was obtained in two passes through the UV unit at a conveyor speed of 30.5 meters/min.

We claim:

1. A photocurable composition comprising an epoxy resin polymerizable to a higher molecular weight and 0.1 to 10% by weight of said epoxy resin of a photodecomposable thiopyrylium salt of the formula:

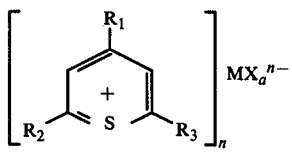

where $R_1$, $R_2$ and $R_3$ are independently selected from the group consisting of hydrogen, alkyl containing 1 to 10 carbon atoms, cycloalkyl containing 5 to 12 carbon atoms, aryl containing 6 to 12 carbon atoms and substituted derivatives thereof, M is a metal or metalloid, X is a halogen radical, a is a whole number equal to 1 to 10 and n is a whole number equal to 1 to 3.

2. A photocurable composition in accordance with claim 1 where the thiopyrylium salt is a 2,4,6-triphenyl thiopyrylium salt.

3. A photocurable composition in accordance with claim 1 where the thiopyrylium salt is a 2,4-diphenyl, 6-methyl thiopyrylium salt.

4. A photocurable composition in accordance with claim 1 where the thiopyrylium salt is a tetrafluoroborate.

5. A photocurable composition in accordance with claim 1 where the thiopyrylium salt is a hexafluorophosphate.

6. The process of curing an epoxy resin which comprises admixing an epoxy resin with 0.1 to 10% by weight of said epoxy resin of a photodecomposable thiopyrylium salt of the formula:

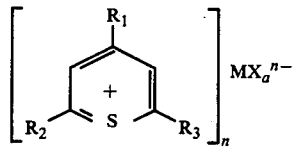

where $R_1$, $R_2$ and $R_3$ are independently selected from the group consisting of hydrogen, alkyl containing 1 to 10 carbon atoms, cycloalkyl containing 5 to 12 carbon atoms, aryl containing 6 to 12 carbon atoms and substituted derivatives thereof, M is a metal or metalloid, X is a halogen radical, a is a whole number equal to 1 to 10 and n is a whole number equal to 1 to 3 and thereafter exposing said admixture to radiation.

7. The process according to claim 6 wherein the radiation is UV radiation.

8. The process according to claim 6 wherein the radiation is high energy ionizing radiation.

9. The process of coating a substrate which comprises admixing an epoxy resin with 0.1 to 10% by weight of said epoxy resin of a photodecomposable thiopyrylium salt of the formula:

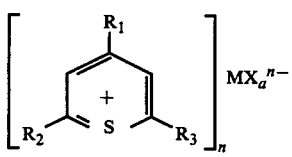

where $R_1$, $R_2$ and $R_3$ are independently selected from the group consisting of hydrogen, alkyl containing 1 to 10 carbon atoms, cycloalkyl containing 5 to 12 carbon atoms, aryl containing 6 to 12 carbon atoms and substituted derivatives thereof, M is a metal or metalloid, X is a halogen radical, a is a whole number equal to 1 to 10 and n is a whole number equal to 1 to 3, coating said admixture on the substrate and thereafter exposing said admixture to radiation.

10. The process according to claim 9 wherein the radiation is UV radiation.

11. The process according to claim 9 wherein the radiation is high energy ionizing radiation.

12. The cured epoxy resin formed by irradiating the composition according to claim 1 with ultraviolet radiation or high energy ionizing radiation.

* * * * *

UNITED STATES PATENT AND TRADEMARK OFFICE
CERTIFICATE OF CORRECTION

PATENT NO. : 4,139,655
DATED : February 13, 1979
INVENTOR(S) : Jung-Hsien Tsao

It is certified that error appears in the above-identified patent and that said Letters Patent are hereby corrected as shown below:

Change inventor's name from "Jung-Tsien Tsao" to --Jung-Hsien Tsao--.

*Signed and Sealed this*

*First* Day of *May 1979*

[SEAL]

*Attest:*

RUTH C. MASON
*Attesting Officer*

DONALD W. BANNER
*Commissioner of Patents and Trademarks*